United States Patent Office 3,769,220
Patented Oct. 30, 1973

3,769,220
ANTIFREEZE COMPOSITION
John Gordon Willard and Robert Dale Matson, Austin, Tex., assignors to Jefferson Chemical Company, Inc., Houston, Tex.
No Drawing. Filed Nov. 23, 1970, Ser. No. 92,306
Int. Cl. C09k 3/00
U.S. Cl. 252—75         5 Claims

ABSTRACT OF THE DISCLOSURE

The invention is a combination of inhibitors which effectively prevents corrosion in automotive cooling systems containing antifreeze solution based on water-soluble alcohols. The combination includes disodium phosphate, dipotassium phosphate, sodium metaborate, potassium metaborate, sodium tetraborate, and sodium mercaptobenzothiazole.

BACKGROUND OF THE INVENTION

(1) Field of the invention

The invention pertains to a corrosion inhibitor combination for cooling systems containing antifreeze with solutions based on water soluble alcohols.

(2) Description of the prior art

The prior art teaches that each of the inhibitors included in the antifreeze composition of this invention is effective in preventing corrosion in automotive antifreeze.

SUMMARY OF THE INVENTION

We have discovered a combination of inhibitors which is effective in preventing corrosion in cooling systems containing antifreeze solution based on water-soluble alcohols. The combination of our invention and the concentration ranges as weight percent of the antifreeze composition adapted to be added to water are as follows:

|  | Concentration range weight percent |
|---|---|
| Disodium phosphate | About 0.1 to 1.2. |
| Dipotassium phosphate | About 0.1 to about 3.0. |
| Sodium metaborate | About 0.1 to about 0.4. |
| Potassium metaborate | About 0.1 to about 0.4. |
| Sodium tetraborate | About 0.0 to about 0.2. |
| Sodium mercaptobenzothiazole | About 0.02 to about 0.60. |

The antifreeze composition of this invention is useful for general antifreeze service in automotive engines.

DESCRIPTION OF THE PREFERRED EMBODIMENTS

The combination and concentration of inhibitors of our invention give good corrosion protection to copper, solder, brass, steel, iron and aluminum. Precipitation does not occur in our antifreeze composition when stored at 140° F. or lower and the inhibitor combination is compatible with chromate filters. In addition, the inhibitor combination does not contribute harmfully to aluminum water pump cavitation corrosion. When the antifreeze composition of our invention is to be utilized in a heat exchange system, it may be combined with water in any proportions. The antifreeze compositions of our invention may contain conventional additives such as dyes, antifoam agents, etc. For example, suitable antifoam agents include silicone emulsions and polyglycols. Especially efficient polyglycol antifoam agents are block copolymers prepared by adding ethylene oxide to polypropylene glycol, for example, "Pluronic L61," a product of the Wyandotte Chemical Company.

The freezing point depressants of the present invention include any of the water miscible liquid alcohols such as monohydroxy lower alkyl alcohols and the liquid polyhydroxy alcohols such as the alkylene and dialkylene glycols. Specific examples of the alcohol contemplated herein are methanol, ethanol, propanol, isopropanol, butanol, ethylene glycol, diethylene glycol, propylene glycol, butylene glycol, and mixtures thereof. A preferred glycol is ethylene glycol, which as sold commercially often contains a small amount, up to 10% by weight, of diethylene glycol. The term ethylene glycol as used herein is intended to include either the pure or commercial compound. This is also true of the other freezing point depressant alcohols contemplated herein.

The following examples illustrate the preparation of antifreeze compositions of our invention.

EXAMPLE 1

To 944.1 pounds of ethylene glycol is added 4.3 pounds of five mole borax and the mixture is stirred until dissolved. Then, 11.3 pounds of 50% sodium hydroxide, 19.9 pounds of 45% potassium hydroxide, 18.1 pounds of 75% phosphoric acid, 2.0 pounds of 50% sodium mercaptobenzothiazole, 0.2 pound of Pluronic L61 product, and 0.1 pound of silicone emulsion are added to the mixture. The last two chemicals are for foam inhibiting properties. The mixture is stirred until thoroughly mixed. The resulting antifreeze has the following composition:

|  | Percent |
|---|---|
| Ethylene glycol | 94.41 |
| $Na_2HPO_4$ | 1.0 |
| $K_2HPO_4$ | 1.19 |
| $NaBO_2$ | 0.15 |
| $KBO_2$ | 0.19 |
| $Na_2B_4O_7$ | 0.07 |
| NaMBT | 0.10 |
| Pluronic L61 product | 0.02 |
| Silicone emulsion | 0.01 |
| Water | 2.86 |

EXAMPLE 2

To 954.0 pounds of ethylene glycol is added 4.3 pounds of five mole borax and the mixture is stirred until dissolved. Then, 11.3 pounds of 50% sodium hydroxide, 13.4 pounds of 45% potassium hydroxide, 14.7 pounds of 75% phosphoric acid, 2.0 pounds of 50% sodium mercaptobenzothiazole, 0.2 pound of Pluronic L61 product, and 0.1 pound of silicone emulsion are added to the mixture. The mixture is stirred until thoroughly mixed. The resulting antifreeze has the following composition.

|  | Percent |
|---|---|
| Ethylene glycol | 95.40 |
| $Na_2HPO_4$ | 1.0 |
| $K_2HPO_4$ | 0.74 |
| $NaBO_2$ | 0.15 |
| $KBO_2$ | 0.19 |
| $Na_2B_4O_7$ | 0.07 |
| NaMBT | 0.10 |
| Pluronic L61 product | 0.02 |
| Silicone emulsion | 0.01 |
| Water | 2.32 |

The compositions of these two examples do not form an appreciable amount of precipitate in storage tests at 140° F. The compositions are compatible with chromate filters.

Table I below contains metal corrosion data on aqueous solutions of antifreeze having the composition of our invention given in the Examples 1 and 2. The test is described in ASTM glassware corrosion test D 1384.

TABLE I

| | Weight loss, mg./specimen | | | | | |
|---|---|---|---|---|---|---|
| | Copper | Solder | Brass | Steel | Iron | Aluminum |
| Example 1 | 7 | 10 | 20 | 5 | 3 | 7 |
| Example 2 | 3 | 5 | 11 | 0 | 0 | 3 |

Having thus described our invention, we claim:

1. A corrosion inhibited antifreeze composition consisting essentially of a water soluble liquid alcohol freezing point depressant and an inhibitor combination consisting essentially of the following components wherein the concentration ranges of the inhibitor components are weight percent of said composition:
   about 0.1 to 1.2 weight percent disodium phosphate,
   about 0.1 to about 3.0 weight percent dipotassium phosphate,
   about 0.1 to about 0.4 weight percent sodium metaborate,
   about 0.1 to about 0.4 weight percent potassium metaborate,
   about 0.0 to about 0.2 weight percent sodium tetraborate, and
   about 0.02 to about 0.60 weight percent sodium mercaptobenzothiazole.

2. An antifreeze composition as in claim 1 wherein the liquid alcohol freezing point depressant is ethylene glycol.

3. An antifreeze composition according to claim 2 consisting essentially of ethylene glycol,
   about 1 weight percent disodium phosphate,
   about 0.74 to about 1.19 weight percent dipotassium phosphate,
   about 0.15 weight percent sodium metaborate,
   about 0.19 weight percent potassium metaborate,
   about 0.07 weight percent sodium tetraborate and
   about 0.1 weight percent sodium mercaptobenzothiazole.

4. A process for inhibiting the corrosion of metals which come in contact with an antifreeze composition, which comprises contacting the surface of the metal to be inhibited against corrosion with the antifreezing composition of claim 1.

5. A process as in claim 4 wherein the liquid alcohol freezing point depressant is ethylene glycol.

References Cited
UNITED STATES PATENTS

| | | | |
|---|---|---|---|
| 3,231,502 | 1/1966 | Watkins et al. | 252—75 |
| 3,264,218 | 8/1966 | Daignault et al. | 252—75 |
| 2,384,553 | 9/1945 | Kiffer | 252—75 |
| 2,960,473 | 11/1960 | Meighen et al. | 252—75 |
| 3,238,136 | 3/1966 | Willard et al. | 252—75 |
| 3,291,741 | 12/1966 | Monroe et al. | 252—76 |
| 2,534,030 | 12/1950 | Keller | 252—74 |
| 3,228,884 | 1/1966 | Daignault et al. | 252—75 |

FOREIGN PATENTS 802,304  10/1958  Great Britain _____ 29—E

LEON D. ROSDOL, Primary Examiner

H. A. PITLICK, Assistant Examiner

U.S. Cl. X.R.

252—74, 389